United States Patent [19]
Fly

[11] Patent Number: 6,019,359
[45] Date of Patent: Feb. 1, 2000

[54] LIGHTWEIGHT WELDING TABLE

[76] Inventor: David E. Fly, 316 W. 21st Ave., Menomonie, Wis. 54751

[21] Appl. No.: 09/255,557

[22] Filed: Feb. 22, 1999

[51] Int. Cl.[7] ....................................................... B23Q 3/00
[52] U.S. Cl. ........................................ 269/293; 269/289 R
[58] Field of Search ................................ 269/289 R, 293, 269/49

[56] References Cited

U.S. PATENT DOCUMENTS

| | | |
|---|---|---|
| 822,775 | 6/1906 | Schnurr . |
| 2,679,872 | 6/1954 | Sutcliffe . |
| 4,519,280 | 5/1985 | Cook . |
| 4,647,027 | 3/1987 | Shafto ...................................... 269/100 |
| 4,867,427 | 9/1989 | Cunningham . |
| 4,871,106 | 10/1989 | Wharff . |
| 4,958,814 | 9/1990 | Johnson . |
| 5,318,284 | 6/1994 | Demmeler . |
| 5,397,116 | 3/1995 | Jansen . |

*Primary Examiner*—Timothy V. Eley
*Assistant Examiner*—Benjamin M. Halpern
*Attorney, Agent, or Firm*—Robert J. Harter

[57] ABSTRACT

A weld platen includes a top plate welded to a fabricated support frame. The support frame includes component parts that are interconnected into a lattice structure that provides the top plate with rigidity and flatness. The top plate includes top access holes for conventional clamps and a matrix of work piece alignment holes. The support frame in conjunction with the top plate provides several holes through which the clamps can extend and grip to clamp a work piece against the top plate.

20 Claims, 4 Drawing Sheets

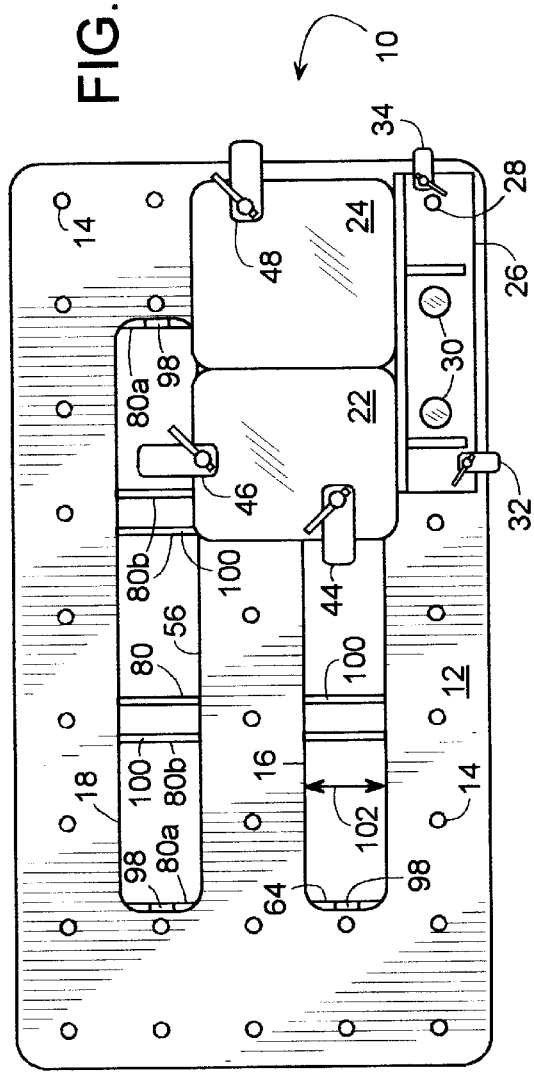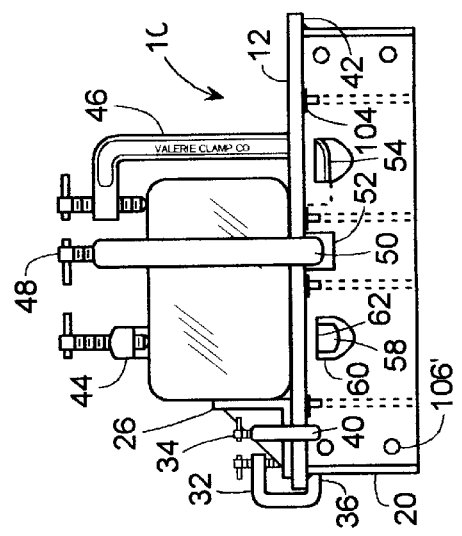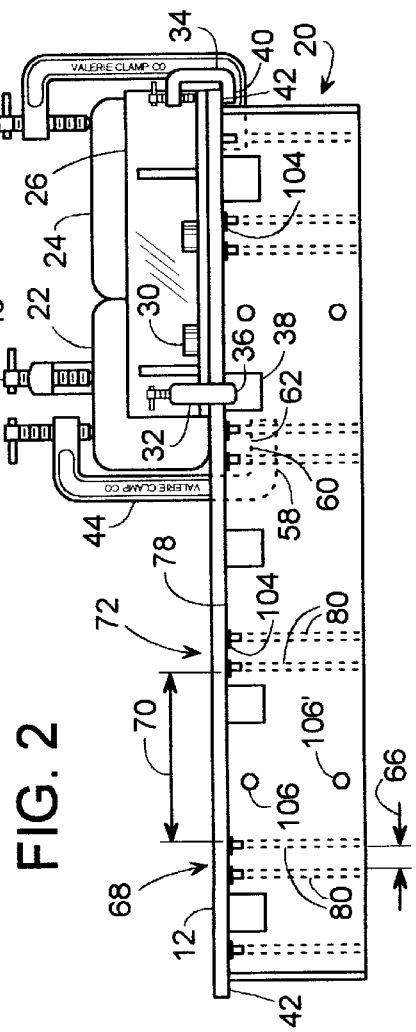

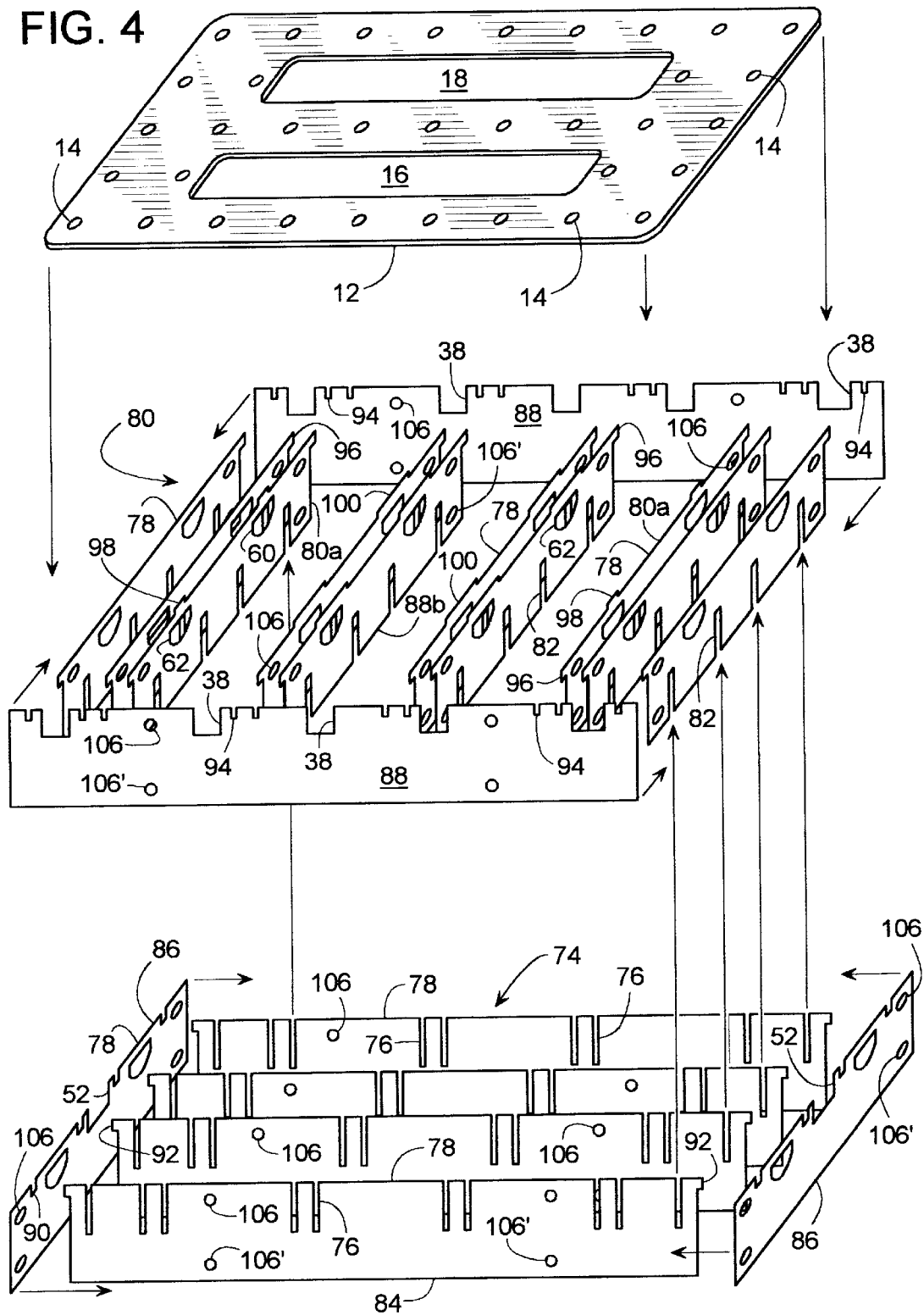

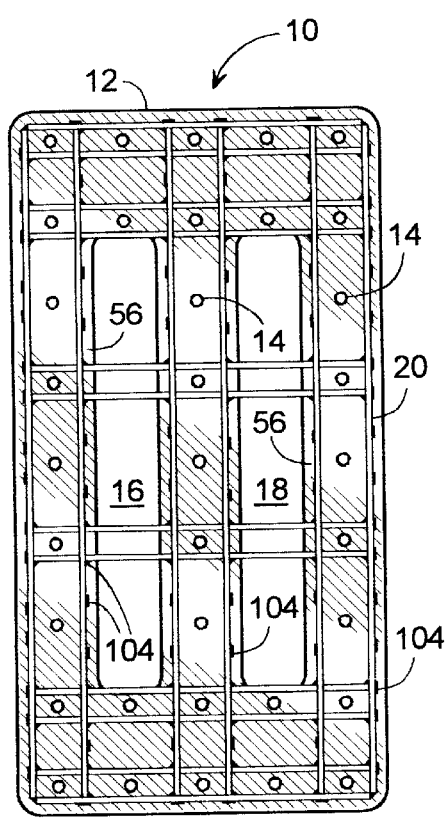
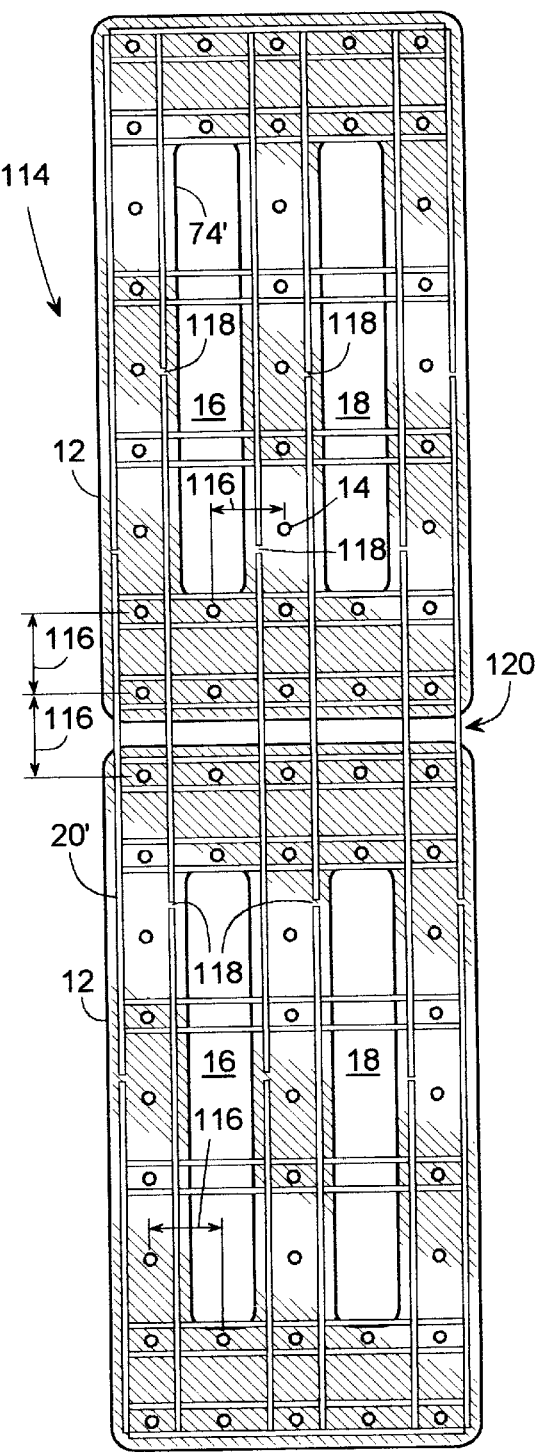

LIGHTWEIGHT WELDING TABLE

BACKGROUND OF THE INVENTION

1. Field of the Invention

The subject invention generally pertains to welding tables and more specifically to a lightweight fabricated platen.

2. Description of Related Art

Conventional welding tables are used to help align and support work pieces that are about to be welded together. A typical welding table or platen is constructed of heavy cast iron to maintain its flatness while supporting large, heavy work pieces. Often the top of the platen is machined or ground flat with additional features machined or cast in place to facilitate the use of various tools to help align or clamp the work pieces. Such welding platens, however, have several drawbacks.

Platens are usually supported by a table or some other means of support that have a fixed height and location, as repositioning such a heavy piece of equipment would take a significant amount of effort. A platen at a fixed height poses a significant ergonomic problem, as an operator may need to stretch or climb to reach the top of large work pieces, and may need to crouch awkwardly to reach others.

Such a problem is especially prevalent in job shops where the size, shape and weight of the incoming work may be unpredictable. Often the welding platen and table supporting it are sized to accommodate the largest anticipated job. Consequently, the platen is often oversized and difficult to work around for other smaller jobs.

Moreover, when a heavy weld platen is mounted to a welding positioner, the weight of the platen itself may consume much of the positioner's weight carrying capacity, thus limiting the allowable weight of the work piece.

Also, conventional weld platens usually have a relatively thick top plate. The holes that are typically machined or cast into the top plate often only accommodate special clamps and tooling that can be expensive and often unavailable in smaller shops. The use of more conventional tooling, such as C-clamps and various vise-grips, are primarily limited to being used only around the outer perimeter of the platen.

SUMMARY OF THE INVENTION

To overcome the problems and drawbacks of conventional welding tables and platens, it is an object of the invention to provide a weld platen that is lightweight, flat, and strong by virtue of a fabricated support frame.

A second object of the invention is to provide a weld platen that includes a top plate with top access holes that facilitate the use of conventional C-clamps and other commonly available clamps near the center of the platen.

A third object of the invention is to provide a weld platen that includes a top plate with top access holes that facilitate the use of down draft ventilation near the center of the platen, thereby reducing the amount of welding fumes that the operator and others nearby might otherwise be subjected.

A fourth object is to provide a weld platen with a fabricated support frame having intermittent fillet welds that are distributed to render the platen's top plate substantially flat, thereby eliminating or minimizing the need for a subsequent straightening operation A fifth object is to provide a weld platen with a support frame assembly whose component parts include integral alignment protrusions and receptacles to ensure that the frame is properly assembled prior to being welded together. Also, the support frame design ensures flatness, A sixth object is to provide a weld platen that is sufficiently light to be mounted upon a conventional weld positioner.

A seventh object is to provide a weld platen with a support frame having a lattice structure that includes numerous openings passing through vertical plates, wherein the openings facilitate the use of conventional C-clamps and other commonly available clamps.

A eighth object is to provide a weld platen that is readily aligned and removably joined to an adjacent platen to temporarily create an effectively larger weld platen.

An ninth object is to use a conventional and nominally sized round steel bar to conveniently align two or more platens to each other in a spaced-apart relationship, and subsequently remove the bar to allow a welding operator free access between the aligned platens.

These and other objects of the invention are provided by a novel weld platen that includes a top plate welded to a fabricated support frame. The support frame includes component parts that are interconnected into a lattice structure that provides the top plate with rigidity and flatness. The top plate includes top access holes for conventional clamps and a matrix of work piece alignment holes. The support frame in conjunction with the top plate provides several clearance holes through which the clamps can extend and grip to clamp a work piece against the top plate.

BRIEF DESCRIPTION OF THE DRAWINGS

FIG. 1 is a top view of one embodiment of a weld platen.

FIG. 2 is a front view of FIG. 1.

FIG. 3 is an end view of FIG. 1.

FIG. 4 is an exploded view of a weld platen.

FIG. 7 is a bottom view of an assembled weld plate.

FIG. 8 is a bottom view of permanently interconnected weld platens

DESCRIPTION OF THE PREFERRED EMBODIMENT

Figure 5:
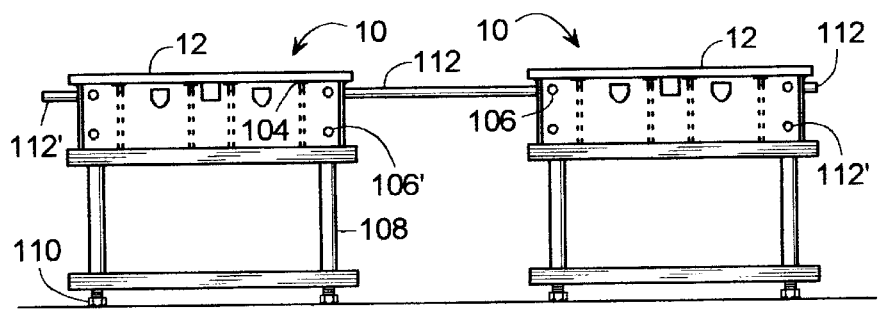
FIG. 5 is an end view of interconnected weld platens.

FIGS. 1, 2, and 3 respectively show a top, front, and end view of an industrial work platform or platen 10. In this particular example, a top plate 12 is a ⅜ inch thick steel plate with a matrix of evenly distributed work piece alignment holes 14 and two top access holes 16 and 18. Access holes 16 and 18 have a larger opening than holes 14 to facilitate installing clamps and, if desired, providing downdraft ventilation. A support frame 20 welded to the underside of top plate 12 provides a flat, rigid and relatively lightweight work platform that can be used in a variety of industrial applications.

For example, the work platform is particularly useful as a weld platen for temporarily supporting and aligning work pieces, such as items 22 and 24, to facilitate their being welded together. In such an application, a work piece guide 26, such as a gussetted angle iron having holes 28 whose spacing coincide with that of the platen's alignment holes 14, can be aligned square, or at a predetermined angle, to top plate 12 by passing commercially available alignment pins 30 (e.g., an expanding diameter pin) through superimposed holes 28 and 14. Small clamps 32 and 34 can help keep guide 26 in place. A bottom portion 36 of clamp 32 reaches through a tool clearance hole 38 in support frame 20 to grip the underside of top plate 12. A similar bottom portion 40 of clamp 34 grips the underside of a peripheral lip 42. Lip 42 is substantially coplanar with top plate 12 and cantilevered therefrom to extend outward beyond support frame 20.

With guide 26 clamped to platen 10, work pieces 22 and 24 can be properly aligned by positioning them up against guide 26, and then held there by clamps 44, 46 and 48. In a manner similar to that of clamp 32, a bottom portion 50 of clamp 48 extends through a tool clearance hole 52 in support frame 20 to grip the underside of top plate 12. A bottom portion 54 of clamp 46 reaches through top access hole 18 to engage the underside of an internal lip 56. And a bottom portion 58 of clamp 44 reaches through top access hole 16 and then across to extend through a tool clearance aperture 60 to grip support frame 20 along an upper edge 62 of aperture 60. In a preferred embodiment, cross-ties 80 are situated in pairs, i.e., a spacing 66 between two cross-ties 80 of one pair 68, is less than a spacing 70 between two cross ties 80 of adjacent pairs 68 and 72. A pair of closely spaced-apart cross-ties provides a broader base for the bottom portion 58 of clamp 44 to grip than what would be provided by a single cross-tie. In other words, the bottom portion 58 can span two upper edges 62 of aperture 60 instead of just one for greater clamp stability. Of course, an upper portion of clamps 32, 34, 44, 46 and 48 grip guide 26 or one of the work pieces 22 or 24 accordingly. Once everything is properly clamped in place, work can be performed on work pieces 22 and 24, such as, in this example, tack welding items 22 and 24 together.

FIG. 4 shows an exploded view of the various components of platen 10 and how 10 they fit together. In this particular example, platen 10 includes four 3/16 inch thick beams 74 each having 10 beam slits 76 that are open to an upper edge 78. Platen 10 also includes ten 3/16 inch thick cross-ties 80 of which there are three styles 80a, 80b and 80c. Each cross-tie 80 has four cross-tie slits 82 each of which slip over a beam slit 76 to provide an interconnected lattice of beams 74 and cross-ties 80. For greater strength, the longer of beam 74 and cross-tie 80 (which in this case is beam 74) has its slits 76 at the top to provide the longest support member with a lower edge 84 that is continuous to resist the relatively high tensile stress in this area.

The generally rectangular perimeter of the interconnected lattice of beams and cross-ties is surrounded by a corresponding rectangular arrangement of side plates, two of which are identified by numeral 86 and the other two by numeral 88. Each side plate 86 is similar to cross-ties 80; however, instead of slits 82, side plate 86 has four receptacles 90 that receive a corresponding four lateral protrusions 92 provided by the four beams 74. Protrusions 92 engaging receptacles 90 serve to align side plate 86 to beams 74 and also provide a convenient spot to weld plate 86 to beams 74 and top plate 12 along a neutral axis of each beam 74 to minimize weld shrink distortion. Each side plate 88 is similar to beams 74; however, instead of slits 76, side plate 88 has ten receptacles 94 that receive a corresponding ten lateral protrusions 96 provided by the ten cross-ties 80. Protrusions 96 engaging receptacles 94 serve to align side plate 88 to cross-ties 80 and also provide a good spot to weld plate 88 to cross-ties 80 and top plate 12. The interconnected assembly of beams 74, cross-ties 80, and side plates 86 and 88 are aligned and connected to top plate 12

To align top plate 12 to support frame 20 in one direction, cross-ties 80a have alignment protrusions 98 that extend upward from upper edge 78 of frame 20 to engage a receptacle in top plate 12. In this example, top access holes 16 and 18 provide such a receptacle. For alignment in the other direction, perpendicular to the first, additional alignment protrusions 100 extending upward from cross-ties 80b and protruding into top access holes 16 and 18 span substantially a fall width 102 of hole 16 and 18. Consequently, the interconnection of slits 76 and 82, the interconnection of protrusions 92, 96, 98 and 100 with their respective receptacles 90, 94, 16–18 and 16–18 establishes the proper positional relationship of all the parts that make up platen 10.

Once all the parts are properly positioned relative to each other, they can be joined by any one of a variety of methods. It has been found that ajoining process that provides intermittently distributed fillets 104 at predetermined locations reinforces the interface of two or more adjoining parts while minimizing distortion of the platen created by a continuous fillet. The term "fillet" used herein and below refers to a joining structure that extends above the surface of the parts about to be joined. Examples of a fillet would include, but not be limited to, a weld fillet, a glue fillet, an L-shaped bracket, a triangular gusset, a mechanical fastener passing through the top plate, or a laser weld passing through the top plate. In a preferred embodiment of the invention, fillets 104 are provided by intermittently welding at the locations shown in FIGS. 2, 3, 5 and 7. However, it should be appreciated by those skilled in the art, that the quantity and location of the fillets may vary depending on a number of factors including the platen's material, physical dimensions, required strength, required flatness, and possible supplemental processes such as preheat, post-heat, vibratory stress relief, and surface grinding. In some embodiments of the invention, the supplemental processes just mentioned are deemed unnecessary when the component parts of the platen are completely laser cut and temporarily bolted together (sometimes to a rather thick, heavy flat fixture plate) prior to being welded. The accuracy of laser cutting lends itself well to creating features of platen 10 including, but not limited to, work piece alignment holes 14 top access holes 16 and 18, tool clearance apertures 38 and 60, and platen alignment holes 106 that facilitate the temporary alignment and interconnection of two or more adjacent work platforms.

Figure 6:
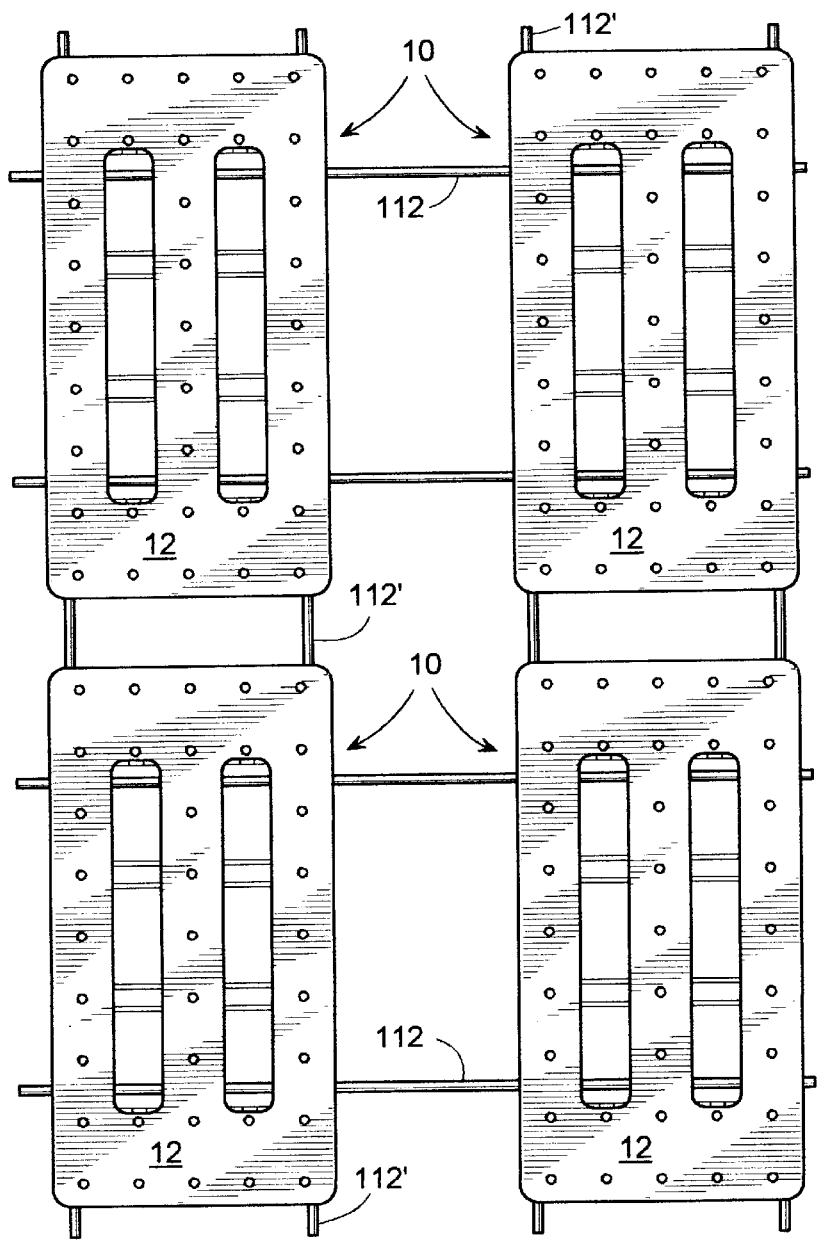
FIG. 6 is a top view of FIG. 5.

Holes 106 and 106' allow two or more platens 10 to be interconnected alongside each other with their top plates 12 in coplanar alignment, as shown in FIGS. 5 and 6. In this example, four platens 10 are separately mounted to four work stands or tables 108 whose heights are adjustable in some conventional manner such as jackscrews 110, which are schematically illustrated to represent the wide variety of conventional adjustable height devices including, but not limited to, acme screws, hydraulic jacks, scissors lifts, and adjustable height/lockable casters. Additional jackscrews 110 could also be mounted between stand 108 and platen 10 to facilitate even more precise coplanar alignment of platens 10. To ensure that tables 108 are aligned, straight elongated rods 112 and 112' can be slipped through platen alignment holes 106 and 106' respectively. One set of holes 106 are situated higher than another set 106' so that rods 112 and 112' can pass through each platen 10 at right angles to each other without one rod interfering with another perpendicular to it.

Two or more top plates 12 can be permanently interconnected to provide one larger platen 114, as will be explained in reference to FIGS. 7 and 8. FIG. 7 is a bottom view of platen 10 showing the intermittent fillets 104 that join top plate 12 to support frame 20. FIG. 8 is a bottom view of platen 114 comprising two top plates 12 that are slightly separated to maintain an orthogonal uniform spacing 116 between adjacent rows of alignment holes 14. By varying the length of beams 74' and staggering their positions and interfaces 118, an extra long support frame 20' is created that provides substantial strength even at the interface 120 between the two top plates 12. In this example, the actual positions of their intermittent fillets are not shown, as their position may be the same as those shown in FIG. 7 or vary considerably due to the factors previously mentioned.

Although the invention is described with respect to a preferred embodiment, modifications thereto will be apparent to those skilled in the art. Therefore, the scope of the invention is to be determined by reference to the claims, which follow.

I claim:

1. An industrial work platform, comprising:
    a plurality of beams disposed in a side-by-side, spaced-apart relationship, each of said plurality of beams defining a plurality of beam slits;
    a plurality of cross-ties traversing said plurality of beams, each of said plurality of cross-ties defining a plurality of cross-tie slits, said plurality of cross-ties being joined to said plurality of beams at said plurality of beam slits and said plurality of cross-tie slits to create a support frame having an upper edge;
    a top plate attached to said upper edge of said support frame, said top plate defining a matrix of work piece alignment holes each of which provide a first open area, said top plate defining a plurality of top access holes each of which provide a second open area, wherein said first open area is smaller than said second open area; and
    an array of intermittent fillets joining said plurality of beams to said plurality of cross-ties and joining said top plate to said upper edge.

2. The industrial work platform of claim 1, wherein at least one of said plurality of beams and said plurality of cross-ties define a plurality of slots that are open to said upper edge such that each of said plurality of slots in conjunction with said top plate define a tool clearance hole.

3. The industrial work platform of claim 1, wherein at least one of said plurality of beams and said plurality of cross-ties define a plurality of tool clearance holes therethrough.

4. The industrial work platform of claim 3, wherein at least one of said plurality of beams and said plurality of cross-ties are distributed so as to comprise a plurality of pairs of support members, wherein a spacing between two adjacent support members of one of said plurality of pairs of support members is less than a second spacing between two adjacent pairs of support members, wherein each of said plurality of pairs of support members have said plurality of tool clearance holes extending therethrough.

5. The industrial work platform of claim 1, further comprising a peripheral lip substantially coplanar with said top plate and cantilevered therefrom to extend outward beyond said plurality of beams and said plurality of cross-ties.

6. The industrial work platform of claim 1, further comprising an internal lip substantially coplanar with said top plate, disposed around each of said plurality of access holes, and spaced apart from at least one of said plurality of beams and said plurality of cross-ties.

7. The industrial work platform of claim 1, further comprising a plurality of alignment protrusions extending upward from said upper edge and engaging a receptacle defined by said top plate to align said support frame thereto.

8. The industrial work platform of claim 7, wherein said receptacle is provided by at least one of said plurality of top access holes.

9. The industrial work platform of claim 1, further comprising a plurality of side end plates arranged in a rectangle about said support frame and attached thereto, said side plates defining a plurality of receptacles that engage a corresponding plurality of lateral protrusions extending from said support frame.

10. The industrial work platform of claim 1, wherein said plurality of beams are longer than said plurality of cross-ties, and wherein said plurality of beam sits are open to said upper edge.

11. The industrial work platform of claim 1, wherein said support frame defines a first plurality of alignment holes adapted to receive at least a first elongated rod extending substantially parallel to said top plate to facilitate aligning a plurality of said industrial work platforms in relation to each other.

12. The industrial work platform of claim 11, wherein said support frame defines a second plurality of alignment holes adapted to receive at least a second elongated rod extending substantially parallel to said top plate and substantially perpendicular to said first elongated rod to facilitate aligning said plurality of said industrial work platforms in relation to each other, said first plurality of alignment holes being vertically offset to said second plurality of alignment holes to prevent said first elongated rod from interfering with said second elongated rod.

13. The industrial work platform of claim 1, further comprising a second plurality of beams disposed in an end-to-end relationship with said plurality of beams to create a plurality of interfaces where said plurality of beams approach said second plurality of beams, said plurality of beams being of varying length and said second plurality of beams being of varying length to distribute said plurality of interfaces in a staggered arrangement.

14. The industrial work platform of claim 13, further comprising a second top plate attached to said upper edge and adjacent said top plate to cover an added length of said support frame created by said second plurality of beams.

15. An industrial work platform, comprising:
    a plurality of beams disposed in a side-by-side, spaced-apart relationship, each of said plurality of beams defining a plurality of beam silts;
    a plurality of cross-ties traversing said plurality of beams, each of said plurality of cross-ties defining a plurality of cross-tie slits, said plurality of cross-ties being joined to said plurality of beams at said plurality of beam slits and said plurality of cross-tie slits to create a support frame having an upper edge;
    a top plate attached to said upper edge of said support frame, said top plate defining a matrix of work piece alignment holes each of which provide a first open area, said top plate defining a plurality of top access holes each of which provide a second open area, wherein said first open area is smaller than said second open area
    an array of intermittent fillets joining said plurality of beams to said plurality of cross-ties and joining said top plate to said upper edge; and
    a peripheral lip substantially coplanar with said top plate and cantilevered therefrom to extend outward beyond said plurality of beams and said plurality of cross-ties, and wherein at least one of said plurality of beams and said plurality of cross-ties define a plurality of tool clearance holes therethrough.

16. The industrial work platform of claim 15, wherein at least one of said plurality of beams and said plurality of cross-ties define a plurality of slots that are open to said upper edge such that each of said plurality of slots in conjunction with said top plate define a second tool clearance hole.

17. The industrial work platform of claim 15, wherein at least one of said plurality of beams and said plurality of cross-ties are distributed so as to comprise a plurality of pairs of support members, wherein a spacing between two adjacent support members of one of said plurality of pairs of support members is less than a second spacing between two adjacent pairs of support members, wherein each of said plurality of pairs of support members have said plurality of tool clearance holes extending therethrough.

18. The industrial work platform of claim 15, further comprising a plurality of alignment protrusions extending upward from said upper edge and engaging a receptacle defined by said top plate to align said support frame thereto.

19. An industrial work platform comprising:

a plurality of beams disposed in a side-by-side, spaced-apart relationship, each of said plurality of beams defining a plurality of beam slits;

a plurality of cross-ties traversing said plurality of beams, each of said plurality of cross-ties defining a plurality of cross-tie slits, said plurality of cross-ties being joined to said plurality of beams at said plurality of beam slits and said plurality of cross-tie slits to create a support frame having an upper edge, at least one of said plurality of beams and said plurality of cross-ties defining a plurality of tool clearance holes therethrough;

a top plate attached to said upper edge of said support frame, said top plate defining a matrix of work piece alignment holes each of which provide a first open area, said top plate defining a plurality of top access holes each of which provide a second open area, wherein said first open area is smaller than said second open area, at least one of said plurality of beams and said plurality of cross-ties defining a plurality of slots that are open to said upper edge such that each of said plurality of slots in conjunction with said top plate define a second tool clearance hole, at least one of said plurality of beams and said plurality of cross-ties being distributed so as to comprise a plurality of pairs of support members, wherein a spacing between two adjacent support members of one of said plurality of pairs of support members is less than a second spacing between two adjacent pairs of support members, wherein each of said plurality of pairs of support members have said plurality of tool clearance holes extending therethrough;

an array of intermittent fillets joining said plurality of beams to said plurality of cross-ties and joining said top plate to said upper edge;

an internal lip substantially coplanar with said top plate, disposed around each of said plurality of access holes, and spaced apart from at least one of said plurality of beams and said plurality of cross-ties; and a peripheral lip substantially coplanar with said top plate and cantilevered therefrom to extend outward beyond said plurality of beams and said plurality of cross-ties.

20. The industrial work platform of claim 19, further comprising a plurality of alignment protrusions extending upward from said upper edge and engaging a receptacle defined by said top plate to align said support frame thereto.

* * * * *